United States Patent Office 3,301,861
Patented Jan. 31, 1967

3,301,861
CERTAIN 1-ALKYL-2,4-BIS(DIALKYLAMINO)-QUINOLINIUM SALTS
Rudolf Pfister and Alfred R. Sallmann, Basel, Switzerland, assignors to Geigy Chemical Corporation, Greenburgh, N.Y., a corporation of Delaware
No Drawing. Filed Aug. 20, 1963, Ser. No. 303,416
Claims priority, application Switzerland, Aug. 31, 1962, 10,381/62
4 Claims. (Cl. 260—286)

The present invention concerns a process for the production of carbostyril derivatives having valuable pharmacological properties, in particular analgetic, antiphlogistic and antipyretic activity.

It has surprisingly been found that carbostyril derivatives of the general formula

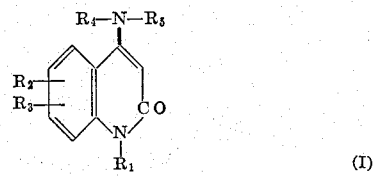

(I)

wherein $R_1$ represents an unbranched alkyl radical with at most 3 carbon atoms,
$R_2$ represents hydrogen, a halogen atom in particular chlorine or bromine a lower alkyl or lower alkoxy group, the nitro group, cyano group or trifluoromethyl group,
$R_3$ represents hydrogen, a halogen atom, is particular chlorine or bromine, or a lower alkyl or lower alkoxy group or, when taken together with $R_2$ and in a position vicinal to $R_3$, the methyl-enedioxy group, and
$R_4$ and $R_5$ represent each independently a lower alkyl radical or $R_4$ and $R_5$ taken together represent lower alkyl groups which bound to each other and forming an unsubstituted or a lower alkyl-substituted polymethylene radical with a total of 4 to 7 carbon atoms, while the term "lower" in connection with "alkyl" or "alkoxy" denotes that these groups have from 1 to 4 carbon atoms, are produced in a simple manner and with excellent yields, starting from easily accessible 2,4-dichloro-bromo-quinolines of the formula

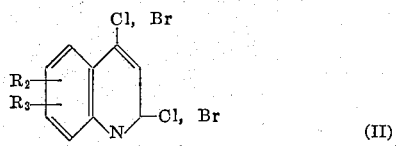

(II)

wherein $R_2$ and $R_3$ have the meanings given above, (a) By reacting a compound of Formula II in the presence of an acid binding agent, with at least double the molar amounts of a lower dialkylamine or a polymethyleneimine with preferably from 2 to 8 ring carbon atoms at a temperature of about 100° to 160° C., preferably of 130° to 150° C., at a constant volume, e.g. in an autoclave, for about 10 to 24 hours. Generally tertiary organic bases such as, e.g. triethylamine, or an excess of the secondary amine to be reacted are used as acid binding agents. The chlorine atoms of a 2,4-dichloro-quinoline can be replaced by two identical dialkylamino or polymethyleneimino radicals simultaneously or they can be reacted in steps in each case with an equivalent of different secondary amines according to the definition, in the presence of an acid binding agent. In the stepwise reaction, a 2-di-alkylamino or 2-poly-methyleneimino-4-chloro-quinoline is obtained as intermediate product and this is further reacted with a secondary amine containing the substituents $R_4$ and $R_5$ in the presence of an acid binding agent or an excess of this amine, optionally using a lower alkanol, especially methanol or ethanol, or also phenol as reaction medium.

(b) Reacting the resulting 2,4-bis-tertiary aminoquinoline of the formula

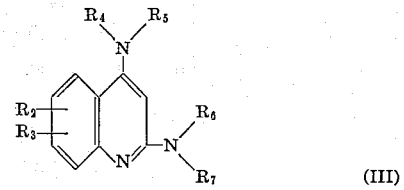

(III)

wherein $R_6$ and $R_7$ represent lower alkyl radicals which can be bound to each other to form an unsubstituted or lower alkyl substituted polymethylene radical with a total of 4 to 7 carbon atoms, and
$R_2$, $R_3$, $R_4$ and $R_5$ have the meanings given above, at a raised temperature with a reactive ester of a primary alkanol having at most 3 carbon atoms according to the formula $$R_1\text{---OH}$$

wherein $R_1$ has the meaning given above, thereby obtaining a compound of the formula

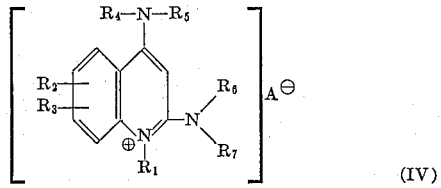

(IV)

wherein $A^\ominus$ represents the anion of the acid present in the reactive ester above mentioned, and
$R_1$, $R_2$, $R_3$, $R_4$, $R_5$, $R_6$ and $R_7$ have the meanings given above, and (c) Treating this compound with the aqueous or aqueous/organic solution of an inorganic base, whereby the corresponding compound of Formula I is obtained.

It is very surprising, and decisive for the usefulness of the process according to the invention on a commercial scale, that, contrary to expectation, the quaternization in step (b) occurs neither at the amino group in the 2-position at the quinoline ring, nor at the amino group in 4-position, as would have been expected primarily, in view of the strongly basic nature of the 4-amino group, but practically exclusively (yield rate 90% crude product) at the nitrogen atom in the 1-position. The two tertiary amino groups appear to remain practically unquaternized even at elevated temperature and even when using a great excess of the quaternizing agent. It would have been expected that the rate of quaternization of the exocyclic nitrogen atom in 4-position would be at least as great or probably even greater than that of the ring nitrogen.

In the intermediate compounds of Formula IV and the final compounds of the Formula I alkyl radical $R_1$ is an unbranched radical, namely a methyl, ethyl or n-propyl group. When $R_2$ and $R_3$ represent halogen they are, for example, chlorine, bromine or fluorine atoms, when they represent lower alkyl or lower alkoxy radicals they are, for example, methyl, ethyl, n-propyl, isopropyl, n-butyl or tert.-butyl radicals or methoxy, ethoxy, n-propoxy, isopropoxy, n-butoxy or isobutoxy radicals. Methyl, ethyl, n-propyl, isopropyl, n-butyl and isobutyl radicals are mentioned as representative or $R_4$, $R_5$, $R_6$ and $R_7$; preferably $R_4$ is identical with $R_6$, and $R_5$ is identical with $R_7$. In another mode of the process according to the invention, $R_4$ and $R_5$ as well as $R_6$ and $R_7$, each pair together with the adjacent nitrogen atoms, represent polymethyleneimino radicals such as, for instance 1-pyrrolidyl, piperidino, hexamethyleneimino or heptamethyleneimino radicals or alkyl-substituted polymethyleneimino radicals such as propyleneimino, 2-methyl-piperidino or 2,4-dimethyl-piperidino radicals.

The second step of the process according to the invention is performed at elevated temperature of 60° C. and higher preferably between 100° and 150° C., on at least equimolar amount, preferably an excess, of a reactive ester of a compound of the alcohol of the formula $R_1$—OH, supra.

Preferred reactive esters are methyliodide, ethyliodide, n-propyliodide and the corresponding lower alkyl bromides and chlorides, and also dialkyl sulfates, such as dimethyl- and diethylsulfate, methane sulfonic acid esters such as the ester of the formula $CH_3—SO_2—OC_2H_5$, or aryl sulfonic acid esters, in particular phenyl sulfonic acid esters such as methyl- or ethyltosylate.

In the quaternization, an organic solvent such as, e.g. acetone or butanone can be added or an excess of reactive ester can serve as sole reaction medium. The reaction is optionally performed in a closed vessel depending on the boiling point of the reactive ester and of the solvent used if any, as well as on the reaction temperature chosen.

In the third step (c) of the process according to the invention, the resulting intermediate product of Formula IV is hydrolytically decomposed to form a compound of Formula I, for example, by treatment with a dilute aqueous or aqueous/alkanolic alkali metal hydroxide solution in particular sodium hydroxide solution. This reaction is performed when necessary at the boiling temperature of the medium, but it also proceeds in many cases with sufficient rate at room temperature or at a moderately raised temperature.

If desired, the compounds of Formula I obtained according to the invention are converted into their salts with inorganic or organic acids. Acids suitable for the salt formation are, for example, hydrochloric acid, hydrobromic acid, phosphoric acid, sulfuric acid, methane sulfonic acid, acetic acid, lactic acid, succinic acid, maleic acid, fumaric acid, maleic acid, tartaric acid, citric acid, benzoic acid, salicylic acid and mandelic acid.

Because of their pharmacological properties already mentioned in the introduction, the compounds of Formula I are suitable, for example, for the relief of pain and for the treatment of rheumatic diseases, for which purpose they can be administered orally. The quaternary salts of Formula IV have bacteriostatic activity; their action on tubercle strains which are resistant to isonicotinic acid hydrazide is particularly marked, for example in compounds having methyl groups as $R_1$, $R_4$, $R_5$, $R_6$ and $R_7$.

The term "lower" as used in this specification and in the appended claims in connection with an aliphatic radical means that said radical has from 1 to not more than 4 carbon atoms.

The following non-limitative examples further illustrate the performance of the process according to the invention. Parts and percentages are given therein by weight, unless stated otherwise, the relationship of parts by weight to parts by volume is as that of grams to cubic centimeters.

*Example 1*

(a) 50 parts of 33% ethanolic dimethylamine solution are added to a solution of 10 parts of 2,4-dichloroquinoline in 100 parts of ethanol, and the solution is heated for 15 hours at 150° in an autoclave. After cooling, the solution is concentrated and the residue is extracted with a chloroform/ether mixture of a volume ratio of 1:1. The extract is washed with water, dried and concentrated.

An oil remains which distills at 120° and 0.01 torr reduced pressure. The 2,4-bis-dimethylamino-quinoline so obtained solidifies in crystalline form. After re-crystallisation from ether, it melts at 68–70°. Yield: 96% calculated on 2,4-dichloroquinoline.

(b) 1 part of 2,4-bis-(dimethylamino)-quinoline, 1 part of methyl iodide and 5 parts of acetone are heated for 15 hours at 100° in a bomb tube. After cooling, the 1 - methyl - 2,4 - bis-(dimethylamino)-quinolium iodide which crystallizes, is filtered off. It is in the form of needles which melt at 178–182°. (Yield of crude product 90%.) After recrystallizing from a 1:1 methanol/ether mixture, colorless crystals are obtained which melt at 183–184°. Yield: 73% calculated on 2,4-bis-dimethyl-amino-quinoline.

(c) 1 part of 1-methyl-2,4-bis-(dimethylamino)-quinolinium iodide is dissolved in 5 parts of hot water and 4 parts of aqueous 2 N sodium hydroxide solution are added. The solution is refluxed for 1 hour, cooled and oil which precipitates is dissolved in ether. After separating the ether solution and evaporating the solvent, an oil remains which distils at 150° under 0.001 torr. By recrystallization from ether, 1-methyl-4-dimethyl-amino-carbostyril is obtained in the form of needles which melt at 58°. Yield: 89%.

1-ethyl-4-dimethylamino-carbostyril,
1-methyl-4-dimethylamino-7-chloro-carbostyril,
1-methyl-4-dimethylamino-6-chloro-carbostyril,
1,6-dimethyl-4-dimethylamino-carbostyril,
1-n-propyl-4-dimethylaminocarbostyril,
1-methyl-4-dimethylamino-7-trifluoromethyl-carbostyril,
1-methyl-4-dimethylamino-7-nitrocarbostyril,
1-methyl-4-dimethylamino-6-cyano-carbostyril,
1-methyl-4-dimethylamino-7-methoxy-carbostyril,
1-methyl-4-dimethylamino-6,7-methylenedioxy-carbostyril,
1-methyl-4-diethylamino-carbostyril are obtained in an analogous manner, by using the corresponding starting quinolines and other reactants.

*Example 2*

(a and b) In an analogous manner according to Example 1(a) and (b), proceeding from 10.7 parts of 2,4-dichloro - 7 - methyl-quinoline, 2,4-bis-dimethylamino-7-methyl-quinoline (B.P.$_{0.001}$ 140°) and 1,7-dimethyl-2,4-bis - (dimethylamino) - quinolinium - iodide (M.P. 167–168°) are obtained.

(c) 7 parts of the iodide mentioned above are dissolved in 150 parts of hot water, 70 parts of aqueous 2 N sodium hydroxide solution are added and the whole is stirred vigorously for 15 minutes at 50–60° After cooling, the reaction product precipitates as an oil. It is separated and worked up according to Example 1(c), whereupon 1,7 - dimethyl - 4 - dimethylamino-carbostyril (B.P.$_{0.02}$ 145°, M.P. 93–95°) is obtained.

We claim:
1. A compound of the formula

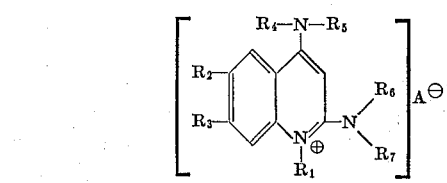

wherein
$R_1$ is unbranched alkyl, with from 1 to 3 carbon atoms,
$R_2$ is a member selected from the group consisting of hydrogen, halogen, lower alkyl, lower alkoxy, nitro and trifluoromethyl, $R_3$ is a member selected from the group consisting of hydrogen, halogen, lower alkyl and lower alkoxy, with the further proviso that when one of $R_2$ or $R_3$ is lower alkyl or lower alkoxy, the other of $R_2$ or $R_3$ must be hydrogen, except that where one of $R_2$ or $R_3$ is methyl, the other $R_2$ or $R_3$ may also be methyl, $R_2$ and $R_3$ taken together is the methylenedioxy group, each of $R_4$, $R_5$, $R_6$, and $R_7$ represent lower alkyl and $A^\ominus$ is an anion selected from the group consisting of iodine, bromide, chloride, n-alkyl sulfate with from 1 to 3 carbon atoms, methane sulfonate and toluene sulfonate.

2. 1 - methyl-2,4-bis-(dimethylamino)-quinolinium iodide.

3. 1,7 - dimethyl - 2,4-bis-(dimethylamino)-quinolinium iodide.

4. 1 - methyl - 2,4-bis-(dimethylamino)-7-chloroquinolinium iodide.

References Cited by the Examiner
UNITED STATES PATENTS

| | | | |
|---|---|---|---|
| 2,507,313 | 5/1950 | Martin et al. | 260—286 |
| 2,585,909 | 2/1952 | Barton et al. | 260—288 X |
| 2,940,976 | 6/1960 | Surrey | 260—286 |
| 3,026,322 | 3/1962 | Schock | 260—286 |

OTHER REFERENCES

Elderfield: "Heterocyclic Compounds," vol. IV, Wiley, 1952, pages 176 and 135 relied upon. QD 400E4.

Horsfall: "Fungicides and Their Action," Chronica Botanica, 1945, page 151, SB 951 H8.

ALEX MAZEL, *Primary Examiner.*

NICHOLAS S. RIZZO, HENRY R. JILES,
*Examiners.*

DONALD G. DAUS, *Assistant Examiner.*